United States Patent [19]

Patrick et al.

[11] Patent Number: 5,790,541
[45] Date of Patent: Aug. 4, 1998

[54] APPARATUS, METHOD, SYSTEM AND SYSTEM METHOD FOR DISTRIBUTED ROUTING IN A MULTIPOINT COMMUNICATION SYSTEM

[75] Inventors: Michael W. Patrick, Assonet; Dennis J. Picker, Lincoln; John A. Perreault, Hopkinton, all of Mass.

[73] Assignee: Motorola, Inc., Schaumburg, Ill.

[21] Appl. No.: 626,060

[22] Filed: Apr. 1, 1996

[51] Int. Cl.$^6$ ............................................... H04L 12/56
[52] U.S. Cl. ...................... 370/392; 370/402; 370/406
[58] Field of Search ......................... 395/200.02, 200.12, 395/200.16; 370/389, 392, 396, 397, 400, 401, 402, 406, 911

[56] References Cited

U.S. PATENT DOCUMENTS

| | | | |
|---|---|---|---|
| 5,404,565 | 4/1995 | Gould et al. | 370/406 |
| 5,434,864 | 7/1995 | Perlman et al. | 370/392 |
| 5,452,304 | 9/1995 | Bienne et al. | 370/392 |
| 5,583,862 | 12/1996 | Callon | 370/402 |

OTHER PUBLICATIONS

"Internet Protocol, DARPA Internet Program Protocol Specification," Information Sciences Institute, University of Southern California, 4676 Admiralty Way, Marina del Rey, California 90291. Sep. 1981, pp. 1–45.

"Multi–LAN Address Resolution," Postel, J., Network Working Group, Request for comments: 925, USC–ISI, Oct. 1984, pp. 1–15.

Primary Examiner—Benedict V. Safourek
Attorney, Agent, or Firm—Nancy R. Gamburd; Jeffrey T. Klayman

[57] ABSTRACT

An apparatus (110, 101), method, system (100) and system method provide for distributed internetwork routing of information in a communication system (100). The communication system (100) is characterized by a topology having a primary node connected to a first network, such as the Internet, and connected via an intermediate network to a mulitplicity of secondary nodes, which are further connected via a secondary network to a plurality of terminals, such as personal computers. The apparatus (110, 101), method, system and system method provide for routing of information between the primary node and the terminals independently of and transparently to any internetwork address of a secondary node. The apparatus (110, 101), method, system and system method conserve internetwork addresses by utilizing internetwork addresses only for a primary node and for terminals.

84 Claims, 7 Drawing Sheets

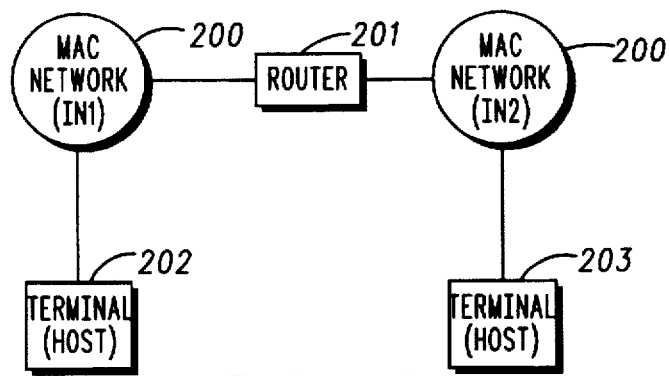
FIG.4 —PRIOR ART—
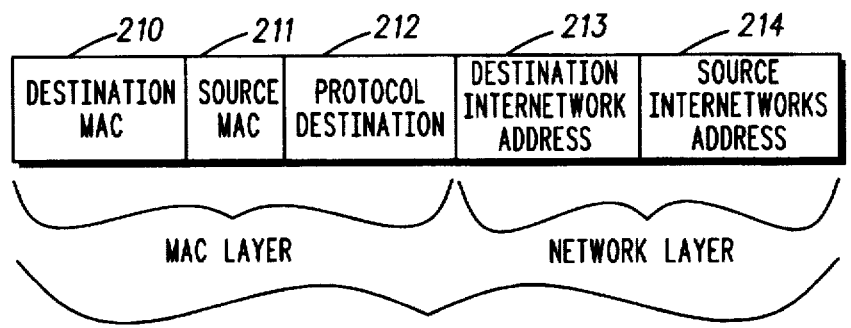
FIG.5
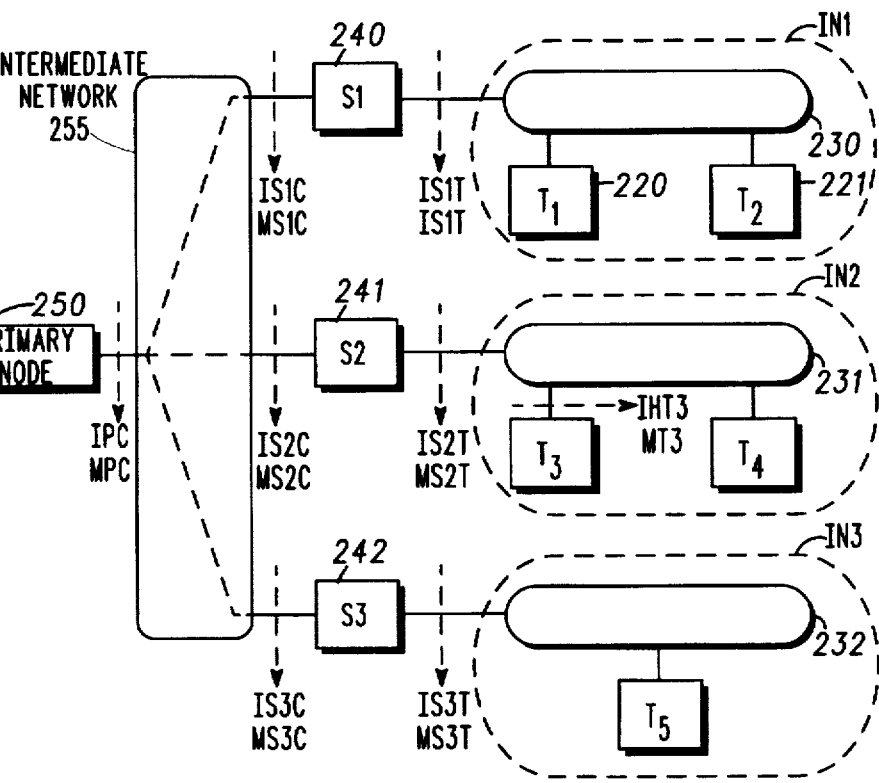
FIG.6 —PRIOR ART—

APPARATUS, METHOD, SYSTEM AND SYSTEM METHOD FOR DISTRIBUTED ROUTING IN A MULTIPOINT COMMUNICATION SYSTEM

FIELD OF THE INVENTION

This invention relates, in general, to data communications and data communications systems and devices and, more specifically, to an apparatus, method and system for distributed routing in a multipoint communication system.

BACKGROUND OF THE INVENTION

With the advent of multimedia communications, data transmission has become increasingly complex. For example, multimedia communications applications such as real time transmission of digitally encoded video, voice, and other forms of data, may require new forms and systems for data communication and data transmission. One such new communication system is the CableComm™ system currently being developed by Motorola, Inc. In the CableComm™ system, a hybrid optical fiber and coaxial cable is utilized to provide substantial bandwidth over existing cable lines to secondary stations such as individual, subscriber access units connected to a personal computer, workstation, other data terminal equipment ("DTE"), for example, in households having new or preexisting cable television capability. These coaxial cables are further connected to fiber optical cables to a central location having centralized, primary (or "head end") controllers or stations having receiving and transmitting capability. Such primary equipment may be connected to any variety of networks or other information sources, from the Internet, various on line services, telephone networks, to video/movie subscriber service. With the CableComm™ system, digital data may be transmitted both in the downstream direction, from the primary station or controller (connected to a network) to the secondary station of an individual user (subscriber access unit), and in the upstream direction, from the secondary station to the primary station (and to a network). As discussed in greater detail below, the topology of such a communication system may be described as having a primary node (such as one formed by a primary station), connected via an intermediate network to many secondary nodes (such as those formed by secondary stations), which are then connected to corresponding terminals (forming a secondary network).

In the CableComm™ system, downstream data is currently intended to be transmitted using 64 quadrature amplitude modulation ("QAM") at a rate of 30 m bps (megabits per second), at 5 m symbols/second utilizing 6 bits/symbol, over channels having 6 MHz bandwidth in the frequency spectrum of 50–750 MHz. Anticipating asymmetrical requirements with large amounts of data tending to be transmitted in the downstream direction rather than the upstream direction, less capacity is provided for upstream data transmission, using π/4 differential quadrature phase shift keying (π/4-DQPSK) modulation in the frequency band from 5–42 MHz with a symbol rate of 384 k symbols/sec with 2 bits/symbol. In addition, the communication system is designed to have a multipoint configuration, i.e ... Many end users (secondary stations, also referred to as subscriber access units) transmitting upstream to a primary station, with one or more primary stations transmitting downstream to the secondary stations. The communication system is also designed for asynchronous transmission, with users transmitting and receiving packets of encoded data, such as video or text files. In addition, it is also highly likely that transmission may be bursty, with various users receiving or transmitting data at indeterminate intervals over selected channels in response to polling, contention, or other protocols from the primary station, rather than transmitting a more continuous and synchronous stream of information over a dedicated or circuit switched connection.

Routing of packets (or frames) of information in such a multipoint communication system, having secondary stations which are geographically distributed from each other (i.e ... , Physically situated in a variety of different locations), presents special difficulties. In the prior art, routing is typically performed within a non-geographically distributed area, such as within a local area network ("LAN"). In addition, in the prior art, routing between various locations has required the assignment of an internetwork address to every device within the system, resulting in excessive use of a limited resource, as there are an inherently limited number of such four byte internetworking addresses. In the prior art, moreover, the implementation of routing functions at a secondary node has tended to require complicated and expensive equipment, severely limiting the expansion of such systems to consumers. Accordingly, a need has remained to provide such routing of information between a terminal (such as a personal computer or other DTE) and a primary node, where many of the terminals are geographically distributed, without excessive utilization of internetwork addresses, and implementable utilizing comparatively less expensive secondary node equipment, such as secondary stations.

BRIEF DESCRIPTION OF THE DRAWINGS

FIG. 4 is a block diagram illustrating the prior art assignment of MAC layer and network layer addresses in a two-network internetwork connected by a router.

FIG. 5 is a diagram illustrating a generalized depiction of a packet format of internetwork packets transmitted on a MAC network of an internetwork.

FIG. 6 is a block diagram illustrating a prior art centralized topology consisting of a primary node connected to one or more secondary nodes via an intermediate network.

DETAILED DESCRIPTION OF THE INVENTION

Figure 1:
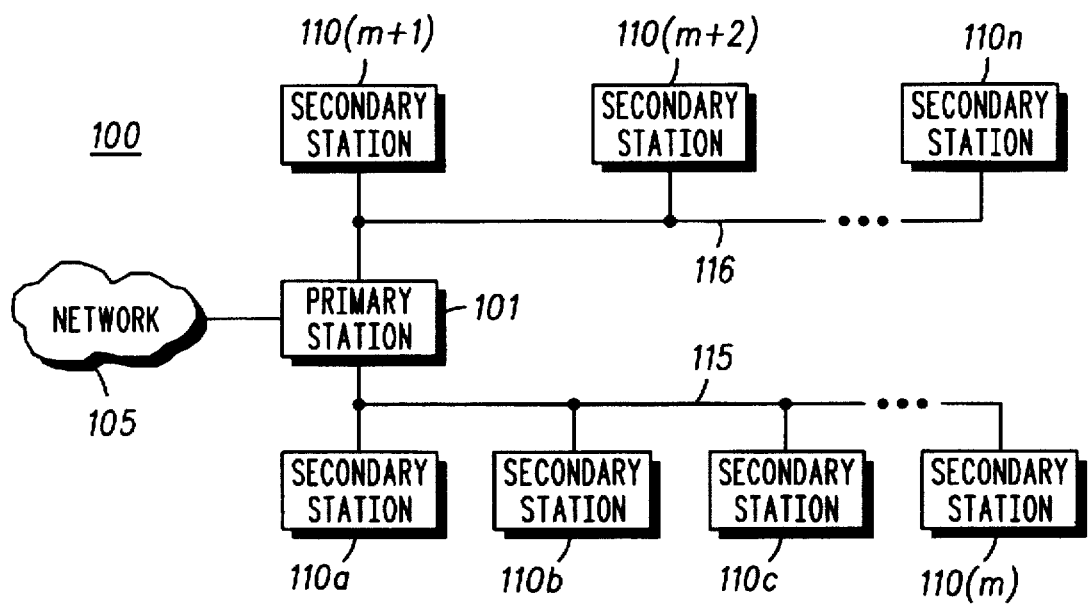
FIG. 1 is a block diagram illustrating a communication system in accordance with the present invention.

As mentioned above, a need has remained to provide for distributed routing in emerging multipoint communications systems, such as the CableComm™ system, without excessive utilization of internetwork addresses, and implementable utilizing comparatively low cost equipment. In accordance with the present invention, such distributed routing is provided, utilizing a minimal or optimal number of internetwork addresses, and utilizing secondary stations which may be implemented at comparatively low cost, with primary network routing functionality implemented in a primary station. FIG. 1 is a block diagram illustrating a communication system 100 in accordance with the present invention, such as a multipoint communication system. As illustrated in FIG. 1, a primary station 101, also referred to as a primary transceiver unit 101, is coupled to a plurality of secondary stations $110_a$ through $110_n$, via communication media 115 and 116. In the preferred embodiment, communication media 115 and 116 are hybrid optical fiber and coaxial cable. In other embodiments, the communication media may be coaxial cable, fiber optic cable, twisted pair wires, and so on, and may also include air, atmosphere or space for wireless and satellite communication. The primary station 101 is also coupled to a network 105, which may include networks such as the Internet, on line services, telephone and cable networks, and other communication systems. The secondary stations $110_a$ through $110_n$ are illustrated in FIG. 1 as connected to the primary station 101 on two segments or branches of a communication medium, such as communication media 115 and 116. Equivalently, the secondary stations $110_a$ through $110_n$ may be connected to more than one primary station, and may be connected to a primary station (such as primary station 101) utilizing more or fewer branches, segments or sections of any communication medium.

Continuing to refer to FIG. 1, in the preferred embodiment, the communication medium, such as communication media 115 and 116, has or supports a plurality of communication channels. For ease of reference, the communication channels in which a primary station, such as the primary station 101, transmits information, signals, or other data to a secondary station, such as secondary station $110_n$, are referred to as downstream channels or downstream communication channels. Also for ease of reference, the communication channels in which a secondary station, such as secondary station $110_n$, transmits information, signals, or other data to a primary station, such as primary station 101, are referred to as upstream channels or upstream communication channels. These various upstream and downstream channels may, of course, be the same physical channel or may be separate physical channels, for example, through time division multiplexing or frequency division multiplexing. These various channels may also be logically divided in other ways, in addition to upstream and downstream directions. As mentioned above, in the preferred embodiment of the CableComm™ system, the communication medium is hybrid fiber coaxial cable, with downstream channels in the frequency spectrum of 50-750 MHz, and with upstream channels in the frequency band from 5-42 MHz.

Figure 2:
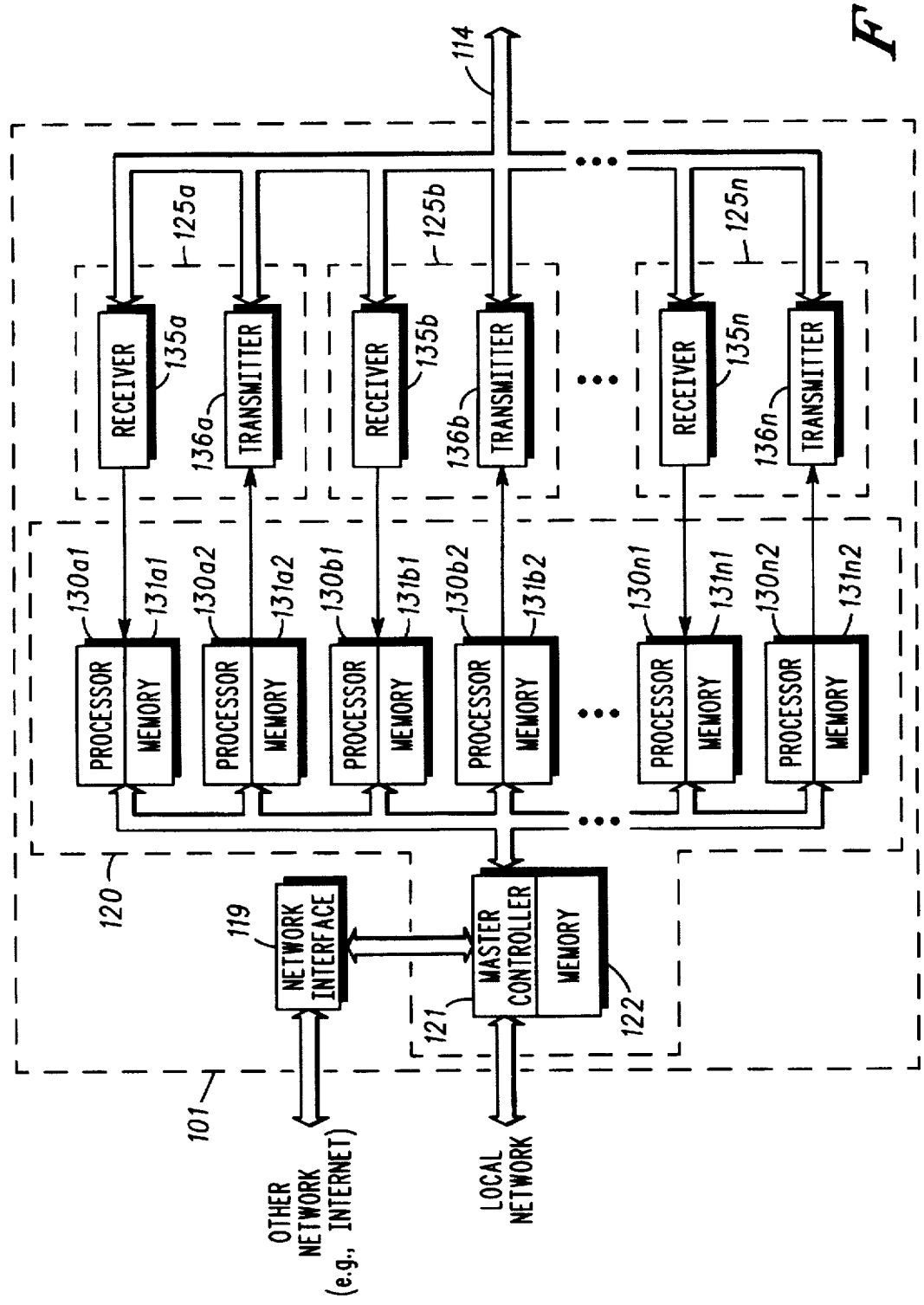
FIG. 2 is a block diagram illustrating a primary station apparatus in accordance with the present invention.

FIG. 2 is a block diagram illustrating a primary station 101 in accordance with the present invention. The primary station 101 (also referred to as a primary transceiver) is coupled to a communication medium 114 for upstream and downstream communication to one or more secondary stations (not illustrated), and is coupleable to a network, such as the Internet, through a network interface 119. The primary station includes a processor arrangement 120 which is connected to a plurality of channel interfaces, channel interface $125_a$ through channel interface $125_n$, for communication over the communication medium 114. The processor arrangement 120 includes a master controller 121 having or connected to memory 122, and one or more additional processors $130_{a1}$ through $130_{n2}$ and corresponding associated memories $131_{a1}$ through $131_{n2}$. In the preferred embodiment, the master controller 121 is a Motorola M68040 processor, and the memory 122 is 16 MB RAM. The master controller 121 performs a variety of higher level functions in the preferred embodiment, such as the spectrum management of the present invention, plus other functions such as routing, management of secondary stations, and communication protocol management (such as SNMP management). The master controller 121 is connected to a plurality of other processors, collectively referred to as processors 130 and separately illustrated as processor $130_{a1}$, processor $130_{a2}$, through processor $130_{n1}$ and processor $130_{n2}$. Each of these processors, processor $130_{a1}$, processor $130_{a2}$, through processor $130_{n1}$ and processor $130_{n2}$, is also coupled to or contains corresponding memory circuits, memory $131_{a1}$, memory $131_{a2}$, through memory $131_{n1}$ and memory $131_{n2}$. In the preferred embodiment, each of these processors 130 are also Motorola M68040 processors, while the corresponding memory circuits, memory $131_{a1}$ through memory $131_{n2}$, are 4 MB RAM. In the preferred embodiment, the processors 130 perform such functions related to upstream and downstream data protocols, such as sending a poll message or an acknowledgment message downstream. Each of these processors $130_{a1}$ through $130_{n2}$ of the processor arrangement 120 are connected to corresponding receivers and transmitters of the channel interfaces, channel interface $125_a$ through channel interface $125_n$ (collectively referred to as channel interfaces 125), namely, receiver $135_a$ through receiver $135_n$ (collectively referred to as receivers 135) and transmitter $136_a$ through transmitter $136_n$ (collectively referred to as transmitters 136). In the preferred embodiment, depending upon the functions implemented, each of the receivers $135_a$ through $135_n$ may include a Motorola M68302 processor, a Motorola 56000 series digital signal processor, a ZIF SYN integrated circuit, and an LSI Logic L64714 (Reed-Solomon decoder), for demodulation and for decoding forward error correction and cyclic redundancy checks. In the preferred embodiment, also depending upon the functions implemented, each of the transmitters $136_a$ through $136_n$ may include a Motorola M68302 processor, a Motorola 56000 series digital signal processor, a ZIF SYN integrated circuit, and an LSI Logic L64711 (Reed-Solomon encoder), for modulation and for coding for forward error correction and cyclic redundancy checks. As a consequence, as used herein, the channel interfaces 125 may be considered to perform the functions of data and other signal reception and transmission, regardless of the specific hardware implementations and additional functions which may or may not be implemented. The various memories illustrated, such as memory 122 or $131_{a1}$, may also be embodied or contained within their corresponding processors, such as master controller 121 or processor $130_{a1}$. The functions of these various components with respect to the present invention are explained in greater detail below with reference to FIGS. 8-12.

Figure 3:
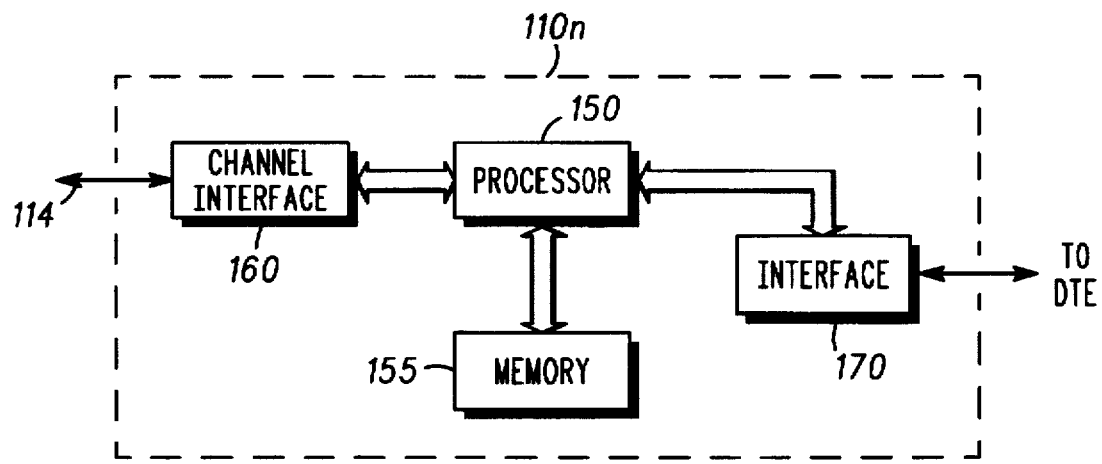
FIG. 3 is a block diagram illustrating a secondary station apparatus in accordance with the present invention.

FIG. 3 is a block diagram illustrating a secondary station $110_n$ in accordance with the present invention. The secondary station $110_n$ includes a processor 150, with the processor 150 having or coupled to a memory 155. In the preferred embodiment, the processor 150 is a Motorola M68302 processor (also known as an integrated multiprotocol processor), and the memory 155 is 256 k ram. The processor 150 is coupled to an interface 170, such as an ethernet port or an RS232 interface, for connection to a computer, a workstation, or other data terminal equipment. The processor 150 is also coupled to a channel interface 160 for communication over the communication medium 114. The channel interface 160, in the preferred embodiment, depending upon the functions implemented, includes a Motorola M68HC11 integrated circuit, a ZIF SYN integrated circuit, a Broadcom BCM3100 QAMlink integrated circuit, a Motorola TxMod integrated circuit, and LSI Logic L64711 and L64714 integrated circuits, and performs such functions as forward error correction encoding and decoding, QAM demodulation (for downstream reception), π/4-DQPSK modulation (for upstream transmission), transmit level and frequency adjustment, for data and other signal reception and transmission. As a consequence, as used herein, the channel interface 160 may be considered to perform the functions of data and other signal reception and transmission, regardless of the specific hardware implementations and additional functions which may or may not be implemented. The memory illustrated as memory 155 may also be embodied or contained within the corresponding processor 150. The additional functions of these components of the secondary station $110_n$ with respect to the invention are also described in greater detail below with reference to FIGS. 8–12.

In the preferred apparatus embodiments illustrated in FIG. 2, the distributed routing method discussed below with reference to FIGS. 8 through 12 may be programmed and stored, as a set of program instructions for subsequent execution, in the processor arrangement 120, and more particularly, in the master controller 121 and its associated memory 122, for a primary station, such as primary station 101 illustrated in FIG. 2. In the preferred apparatus embodiments illustrated in FIG. 2, the distributed routing method discussed below with reference to FIGS. 8 through 12 may be programmed and stored, as a set of program instructions for subsequent execution, in the processor 150, and its associated memory 155, for a secondary station, such as secondary station $110_n$ illustrated in FIG. 3.

FIG. 4 is a block diagram of two networks connected via a router, to illustrate the prior art operation of internetwork routing. In FIG. 4, two media (or medium) access control ("MAC") layer networks 200 are connected by an internetworking router 201. Connected to each corresponding MAC network 200 is a terminal (or host) 202 and a terminal (or host) 203, such as personal computers or workstations. Each of the MAC networks 200 may be a broadcast network such as a local area network ("LAN"), or a non-broadcast circuit-oriented network such as ATM (asynchronous transfer mode), frame relay, or x.25. Each node of a MAC network 200 is assigned a MAC layer address. In most MAC network implementations, all packets transmitted on the MAC network have a header which contains a destination MAC address 210 and a source MAC address 211, as illustrated in FIG. 5, discussed below.

An internetworking node connecting two MAC networks may provide communication between them by repeating, bridging, or routing. Repeating is done at the physical layer (layer 1), and refers to the operation of simply retransmitting everything received on one MAC network onto the other(s). Repeating is impractical in a communication system such as communication system 100 due to its wasteful use of available bandwidth and due to distance and/or timing constraints of existing layer 2 protocols.

Bridging is implemented at the data link layer (layer 2), and refers to the operation of recognizing which MAC network contains which MAC addresses, and forwarding to an attached MAC network only those packets destined for MAC addresses on that network. If a packet is received to a broadcast (all-MACs) address, a bridge copies it to all attached MAC networks. Bridging is generally considered impractical to operate on a large, geographically dispersed scale, and has largely been supplanted by routing in modern networking practice.

Routing is implemented at the network layer (layer 3). Routing depends on assigning an address (or number) to each MAC network, referred to herein as an internetwork network address. Each host or terminal on a MAC network, such as terminals 202 and 203, is also assigned an address or number specific to that host, referred to herein as an internetwork host address. The internetwork host address is usually different than the MAC address, but some routing protocols (such as IPX) use the MAC address as the internetwork host address. In general, hosts on different networks may have the same internetwork host address, so that the combination of both internetwork network address and internetwork host address is needed to uniquely address a host or terminal on an internetwork. This combination of an internetwork network address and internetwork host address is referred to as an internetwork address.

FIG. 5 is a diagram illustrating a generalized depiction of a packet format of internetwork packets transmitted on a MAC network of an internetwork. Routed internetwork packets, as transmitted on a MAC of an internetwork, are illustrated in FIG. 5, as packet 209. As a MAC layer packet, an internetwork packet 209 has a MAC layer which includes a destination MAC address 210 and a source MAC address 211. The MAC (or an immediately adjacent logical link control or LLC) layer header also includes a protocol field 212 to select the protocol of the packet 209. The protocol field 212 contains a protocol designation, such as a protocol number, which indicates which of several possible network layer protocols is used to encode the next part of the packet. For example, the common ethernet LAN uses a two-byte type field to indicate the protocol of the network layer; the value hex 0800 is used in the protocol field to indicate that the Internet protocol (IP) is used for the network layer portion of the packet. The network layer of the packet 209 contains the destination internetwork address 213 and the source internetwork address 214. Each of these internetwork addresses 213 and 214 are instances of a two-part internet address consisting of an internetwork network address and an internetwork host address.

A router, in the prior art, forwards internetwork packets of the form in FIG. 5 as follows: if the destination internetwork address 213 is to an internetwork network address of a directly attached MAC network, it determines the MAC address of the particular host addressed in the destination internetwork address 213, and sends a MAC frame to the final destination host that contains the network layer of the original incoming packet. Different routing protocols use different mechanisms to determine the MAC address. A common mechanism is the address resolution protocol (ARP) used as part of the common TCP/IP internetworking protocol in widespread use. If the destination network address 213 is not to a directly connected internetwork network address, then the router must consult its routing table. The routing table of a router associates known internetwork network addresses and the "next hop" router. The next hop router is another router, attached to (at least) one of the MAC networks attached to the router with the packet to be forwarded, that is capable of forwarding the packet closer to its final destination. Routers typically exchange information among themselves as to which networks are reachable and at what cost.

Common routing protocols in use today include the IP component of TCP/IP, IPX, Decnet, Appletalk, and the OSI IS—IS protocol. These protocols all have different mechanisms for assigning network and host addresses, for determining the MAC addresses of locally attached hosts, and for exchanging network reachability information. Indeed, the principal reason for dividing internetwork addresses into two parts—a network part and a host part—is to permit routers to exchange only network number information. With millions of potential internet hosts, any protocol which required the periodic exchange of all host numbers is generally considered impractical. All of these protocols rely on the concept of two-part internetwork addresses, and packets composed of separate MAC layer and network layer headers, as depicted in FIG. 5.

FIG. 6 is a block diagram illustrating a prior art centralized topology consisting of a primary node connected to one or more secondary nodes via an intermediate network. A number of terminal nodes (or hosts) 220, 221, 222, 223, and 224 are connected to MAC networks 230, 231, and 232, which are referred to as secondary MAC networks as each MAC network 230, 231, and 232, is connected to a corresponding secondary node 240, 241 and 242. The secondary nodes are connected to an intermediate MAC network 255. Without loss of generality to other forms of MAC networks, the intermediate network will be considered for concreteness as a non-broadcast circuit-switched network, i.e., considered to be implemented as a series of real or virtual circuits connecting the secondary nodes 240, 241 and 242 to a single primary node 250. In this topology, all communication between the terminals 220, 221, 222, 223, and 224 and other networks must go through the primary node 250.

FIG. 6 also illustrates the prior art assignment of internetwork addresses to this centralized topology. Each of the MAC networks 230, 231, and 232 is correspondingly assigned a separate internetwork network address (or internetwork address) IN1, IN2, and IN3. The intermediate network 255 is also assigned an internetwork address, INC. Each terminal is assigned an internetwork host address, which together with the internetwork network address assigned to the secondary MAC network connecting it with a secondary node, forms the terminal's internetwork address. Furthermore, as an addressable node on two different networks (the secondary network and the intermediate network), the secondary nodes are assigned host addresses on each of these networks. For example, secondary node S1 is assigned host address IS1T on the IN1 network 260, and is assigned host address IS1C on the INC network 255. The primary node 250 is a router with a routing table that associates the network address of each secondary MAC with the next-hop network host address on the intermediate network 255 of the secondary MAC network. For example, the primary maintains an association of network number IN1 with IS1C.

Figure 7:
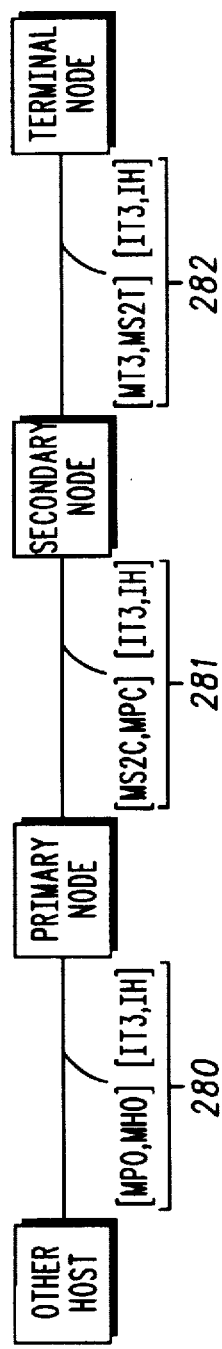
FIG. 7 is a diagram illustrating the prior art address contents of the MAC layer header and network layer headers of packets forwarded in a centralized topology using prior art internetwork routing techniques.

FIG. 7 is a diagram illustrating the prior art address contents of the MAC layer header and network layer headers of packets forwarded in a centralized topology using prior art internetwork routing techniques. FIG. 7 illustrates, as an example, the addressing in the MAC layer and network layer of internetwork packets forwarded from some host on an other network to terminal T3 on the secondary MAC network 231. The other host (or the closest router between the other host and the primary node) sends to the primary node 250 a packet 280 with a MAC destination of the MAC address of the primary node 250 on the other network (MPO). The source-MAC address of packet 280 is the other host's MAC address, MHO. The network layer contains a destination internetwork address of the internetwork address for terminal T3, IT3. The source network layer address is the network address of the packet originator, the other host, IH. If the other host is connected to the primary node 250 by a series of routers, the network layer of packet would remain unchanged, but the MAC layer would have as its source address the MAC address of the last router that forwarded the packet to the primary node 255. The primary node 250 examines the network portion of the destination internetwork address IT3, finding it to be IN2, and utilizing its routing table, determines that the proper next hop is to the secondary router S2, with internetwork address IS2C on the intermediate network 255. The primary node 250 then determines the MAC address of the secondary node 241 on the intermediate network, perhaps by looking up the MAC address in an ARP table (for ARP-based protocols such as IP), and forwards the packet 281 on the intermediate network 255. Packet 281 has a destination MAC address of MS2C, with a source MAC address of the primary node 250 MAC on the intermediate network, MPC, and with network layer unchanged. Secondary node 241 (S2) also operates as a complete router, examining the destination internetwork address IT3, extracts its network portion IN3, and notes that an attached secondary MAC network is assigned that network number IN3. Secondary node 241 (S2) then extracts the internetwork host portion of the destination internetwork address IT3, obtaining IHT3, finds the MAC address MT3 associated with IHT3 (perhaps via ARP), and sends packet 282 on the secondary MAC network 231 which it shares with terminal 222 (T3). Packet 282 has a MAC destination address of MT3, with a MAC source address of secondary node 241 (S2) on the secondary MAC network, MS2T. The network layer addresses are again unchanged.

The prior art routing methodology illustrated in FIGS. 6 and 7, as mentioned above, is problematic when applied to the IP routing protocol in a centralized network involving potentially thousands of geographically distributed secondary nodes. Such a network is envisioned when ATM or other metropolitan-area networks provide connections of millions of consumer homes to the Internet. The principal problem is the relative dearth of IP addresses, as the IP protocol uses only 32 bits to encode both the network portion and the host portion of the internetwork address. In addition, if consumers were to implement multiple-terminal MAC networks in their homes, then classic routing address assignment would call for the assignment of an IP subnetwork number to each consumer MAC network, i.e., every home. Such IP subnetworks require a minimum of four IP host addresses: one for the terminal, one for the secondary node (secondary MAC network side), and two for broadcast purposes (the all-zeros and all-ones host numbers). Furthermore, traditional IP numbering requires a separate IP network address for the intermediate network, and another IP host address for the interface of the secondary node on the intermediate network. Such proliferation of internetworking addresses is avoided utilizing the method and apparatus of the present invention.

Other than the apparatus and method of the present invention, other possible approaches to reduce the proliferation of internetworking protocol ("IP") addresses may include implementing a MAC layer bridge in the secondary node. Such an approach, however, would be highly complex and costly, and utilize excessive bandwidth by retransmission of all broadcasts. Another potential approach, such as a multi-access broadband LAN approach, also consumes excessive bandwidth from retransmission of everything received from a secondary node, restrictions on maximum distance and minimum frame length, and restrictions upon which secondary nodes may utilize the network at any given time (distributed multi-access control). Other possible approaches, such as utilization of a modem, requires that a single terminal be connected to a single secondary node (modem) utilizing a circuit switched, non-broadcast network. In accordance with the present invention, however, a method and apparatus is provided for distributing the functions of internetwork routing among primary and secondary nodes in a centralized system topology, such that internetwork network addresses are not required for secondary MAC networks, and no internetwork host addresses are required for the secondary nodes. The present invention minimizes intermediate network traffic to only that required for internetwork routing (as opposed to ongoing rebroadcasts of all traffic), and yet provides for extremely simple operation of the secondary nodes, which may be implemented at low cost.

In accordance with the present invention, a "distributed" router is implemented in which secondary stations, as secondary nodes, operate as if they were the MAC network interfaces of a single, geographically distributed, gigantic router. From the point of view of the connected terminals, they function as though they are connected to a single router. From the point of view of the other networks, they function as though a single router provides access to a set of networks that comprise all terminals connected to the secondary MAC networks. The apparatus and method of the present invention also avoids a restriction of traditional routers, which require separate internetwork addresses (net numbers) for each MAC interface.

In addition, in accordance with the present invention, calls for the assignment of "logical" or virtual internetwork network numbers (or addresses) are assigned to groups of terminals, independently of the physical networks connecting each such terminal, i.e., there is no required association between the secondary MAC networks and the logical network numbers. Indeed, the invention may support hundreds or thousands more secondary MACs than logical networks. This allows all of the IP host addresses associated with an IP network address to be assigned directly to existing terminals (whereas the assignment of logical network numbers to secondary MAC networks would result in many IP host addresses being assigned but unused or wasted on the "all-zeroes" and "all-ones" broadcast addresses).

As discussed in greater detail below, all terminals are assigned internetwork addresses in the logical networks. The primary node maintains an association between the terminal's logical internetwork address and the intermediate network MAC address (e.g., circuit number) of the secondary node connected to the secondary MAC network (to which the terminal is also connected). Advantageously, the primary node may store the MAC addresses of the secondary nodes and all terminals, allowing it to prepare even the MAC layer header of the packet forwarded from the secondary node to the terminal. This permits less complicated secondary station (node) implementation and operation, since it need merely strip off a secondary network encapsulation layer and forward the packet onto the secondary MAC network.

Figure 8:
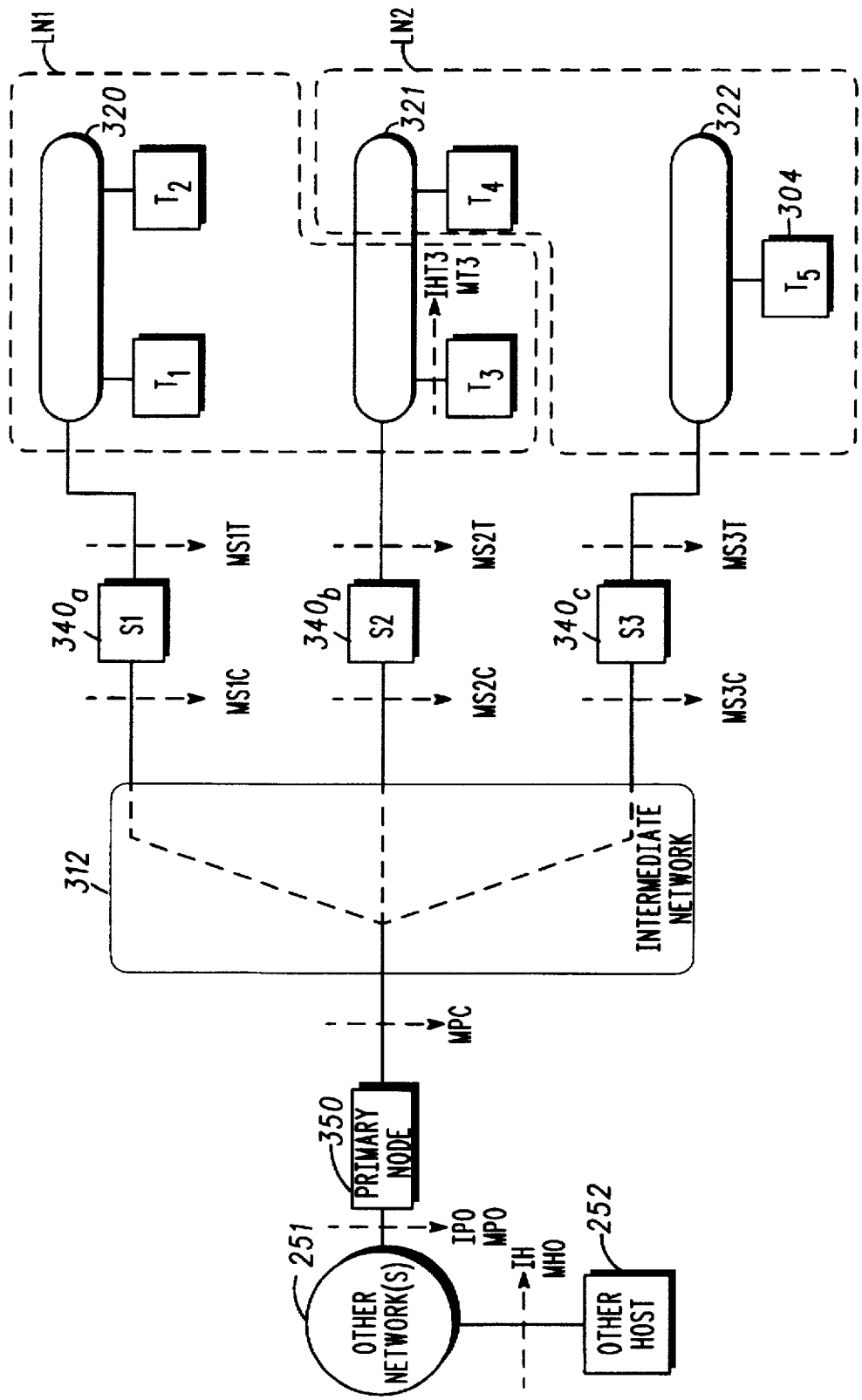
FIG. 8 is a block diagram of a communication system, having logical networks and internetwork addresses in accordance with the present invention.

FIG. 8 is a block diagram of a communication system, having logical networks and internetwork addresses in accordance with the present invention. The communication system illustrated in FIG. 8 employes a similar centralized topology as that illustrated in FIG. 6, namely, a primary node connected via an intermediate network to a plurality of secondary nodes (having terminals connected via a secondary MAC network), but using the distributed routing method and apparatus of the present invention. Rather than assigning internetwork addresses (numbers) to each of the secondary MAC networks 320, 321 and 322, a set of logical network addresses or numbers, such as LN1 (logical network one) and LN2 (logical network two) are defined, and the terminals 300, 301, 302, 303 and 304 are arbitrarily assigned to one (or more) of the logical networks. In FIG. 8, terminals T1 (300), T2 (301), and T3 (302) are assigned to logical network LN1 and terminals T4 (303) and T5 are assigned to LN2. The terminals 300, 301, 302, 303 and 304 maintain their respective secondary MAC network addresses (MT1, MT2, etc.) on their respective secondary MAC networks. Terminal T3 (302), for instance, is defined to have secondary MAC network address MT3, and an internetwork address IT3. The internetwork address of the terminal T3 is considered to be the tuple (LN1, IHT3), i.e., a network part of logical network LN1, and a host part of internet host address IHT3.

Continuing to refer to FIG. 8, the secondary nodes $340_a$, $340_b$, and $340_c$ (such as secondary stations 110) forward packets from the corresponding secondary MAC networks 320, 321 and 322 to the primary node 350 (such as a primary station 101), provided those packets have a protocol field which indicates that they are of the desired internetworking (or ancillary) protocols. For example, a secondary node connected to an ethernet secondary MAC would forward only ethernet packets with a type code of hex 0800 (for IP) and hex 0806 (for the ancillary arp protocol). The secondary nodes also should be capable of recognizing different encapsulations of protocols on the secondary MAC networks. For example, they must recognize both the Type encapsulation of ethernet as mentioned above and the Sub Network Access Protocol (SNAP) encapsulation of IP and ARP in ethernet, as described in the Internet Society's Request For Comments (RFC) 1042. Further, for an ethernet secondary MAC, the secondary node only needs to examine for forwarding those ethernet frames that contain the secondary node's ethernet MAC address MS2T, the ethernet broadcast address, and ethernet multicast addresses if the secondary node is part of a multicast group. The primary node recognizes internetwork protocol transmissions from the terminals and builds an association between a terminal sender's internetwork host address and the secondary node which forwarded the packet. It forwards internetwork packets from terminals to "other" internetwork hosts as a router typically operates.

Figure 9:
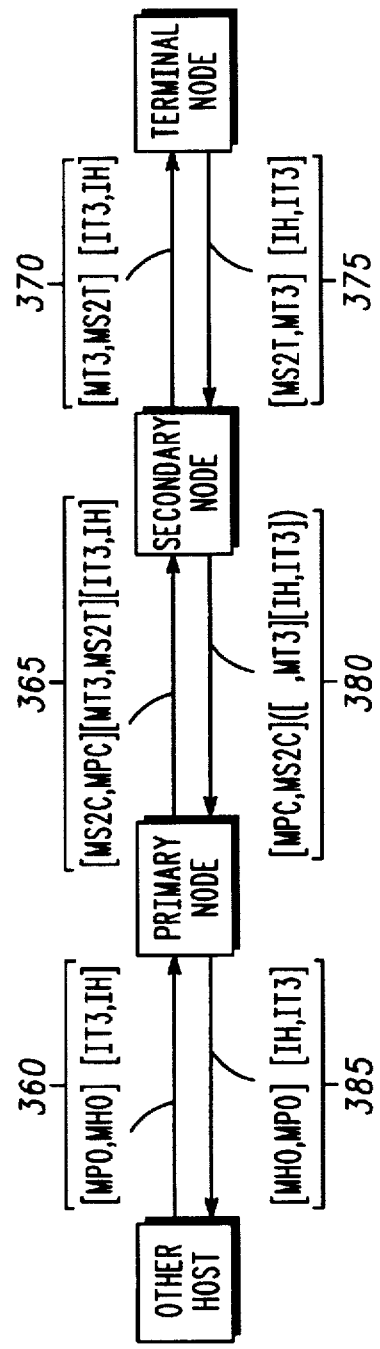
FIG. 9 is a diagram illustrating the contents of an internetwork packet forwarded utilizing the apparatus and method of the present invention.

Continuing to refer to FIG. 8, the operation of a primary node (such as primary station 101) is illustrated for the forwarding of packets from other internetwork hosts to a terminal. The particular example utilizes is an internetwork packet from a host 252 with internetwork host address (denoted IH) to terminal T3 (302). Corresponding packets are illustrated in FIG. 9. The other host (or a router adjacent to the primary node) 252 sends to the primary node 350 a packet (360 in FIG. 9) addressed to a MAC destination of the primary node's MAC address MPO on the other MAC network 251. The source MAC address is MHO, corresponding to the other host (or router) 252. The network layer of the packet 360 has a destination internetwork address to T3, denoted herein as IT3 and consisting of a logical network number (or address) LN1 and a host number IHT3. When the primary node 350 receives this packet 360, it determines, through, for example, a "forwarding" table of internetwork addresses, that IT3 is associated with secondary node S2 ($340_b$). In the preferred embodiment, the forwarding table associates the following information with each known terminal internetwork address: (a) a secondary node MAC address on an intermediate MAC network; (b) a secondary node MAC address on a secondary MAC network; a terminal node MAC address on a secondary MAC network; and an encapsulation type of internetwork port as used by the terminal (or terminal node) on the secondary MAC network. All or some of the information in such a forwarding table may be learned by the primary node 350 or provideded by a communication system operator or service provider. In the preferred embodiment, this forwarding table entry would have been built based on an earlier Internetwork (or ARP) transmission by T3. If no association to the full internetwork address IT3 exists in the forwarding table of primary node 350, it may initiate an ARP broadcast to be sent on some or all secondary MAC networks requesting host IHT3 to identifiy itself. The primary node may have associations statically or dynamically configured which identify which secondary stations are eligible to connect to certain logical networks.

Using the information in the forwarding table, the primary node 350 prepares the MAC layer packet to be transmitted on the secondary MAC network 321, and encapsulates it in an intermediate network packet to secondary node S2 ($340_b$), depicted as packet 365 in FIG. 9. The packet from the primary node 350 to S2 is sent as a MAC layer packet from the source MAC address of the primary node 350 on the intermediate network (MPC) to the destination MAC address of secondary S2 on the intermediate network (MS2C). In the preferred embodiment, the primary node's MAC address (MPC) is unnecessary and is omitted, because only one primary node communicates with a specific secondary node at a given time. Inside this intermediate MAC packet 365 resides the full secondary MAC packet 370 to be transmitted by S2 on the secondary MAC network 321. The secondary MAC packet 370 is addressed to the secondary MAC address of the terminal T3 (MT3) with a source MAC address of the secondary node's MAC address on the secondary network (MS2T). The encapsulation type in use by T3 is used to build the MAC layer header (e.g., whether ethernet Type or SNAP encapsulation is used for IP on ethernet). The secondary node S2 need only strip the intermediate MAC layer header from the packet 365 to form packet 370 and forward onto the secondary MAC network the already-prepared secondary MAC packet 370.

FIG. 9, in conjunction with FIG. 8, also illustrates a packet transmitted from terminal T3 (302), as the source, to be sent to the other host 252, as the destination. Packet 375, transmitted from terminal T3 (302) to the secondary node $304_b$, contains the destination MAC address on the secondary MAC network of secondary node S2 (MS2T), the source MAC address on the secondary MAC network of the terminal T3 (MT3), the destination internetwork address of the other host (IH), and the source internetwork address of the terminal T3 (IT3). The secondary node deletes or omits the destination secondary node MAC address on the secondary MAC network from packet 375, and encapsulates deleted version to form packet 380, adding the destination MAC address of the primary node on the intermediate network (MPC), and the source MAC address of the secondary node on the intermediate network (MS2C). In the preferred embodiment, the destination secondary node MAC address on the secondary MAC network may be omitted by the secondary station, as this information is already known to the primary node, and transmission overhead may be reduced as a consequence of the omission. The primary node then forms packet 385, containing the destination MAC address of the other host 252 on the other network 251 (MHO), the primary node source MAC address on the other network (MPO), followed by the destination internetwork address of the other host (IH), and the source internetwork address of the terminal T3 (IT3).

The functions of the secondary nodes, in summary, are: (a) to forward to the primary node packets received from the secondary network (i.e., packets (with their data and other information) which contain the secondary's MAC address, the ethernet broadcast MAC address, or a multicast MAC address for a multicast group that this secondary station belongs to) only if they have internetwork protocol type or its ancillary ARP protocol type; and (b) to copy onto the secondary MAC network packets (with their data and other information) received from the intermediate network which contain secondary MAC packets. Alternatively, the secondary nodes may insert their own secondary MAC address in the source MAC address field of packets forwarded onto the secondary MAC network, and/or may ensure that packets meet requirements of the secondary MAC network (e.g., for an ethernet secondary MAC network, the adding of pad bytes to meet minimum frame size requirements may be done by the the primary node or the secondary node). The secondary nodes are not required to maintain any state information on the set of terminals attached to them, or the available logical networks, or indeed any status of other secondary nodes, permitting a much less complex and lower cost implementation than prior art bridge or router implementations.

Figure 10:
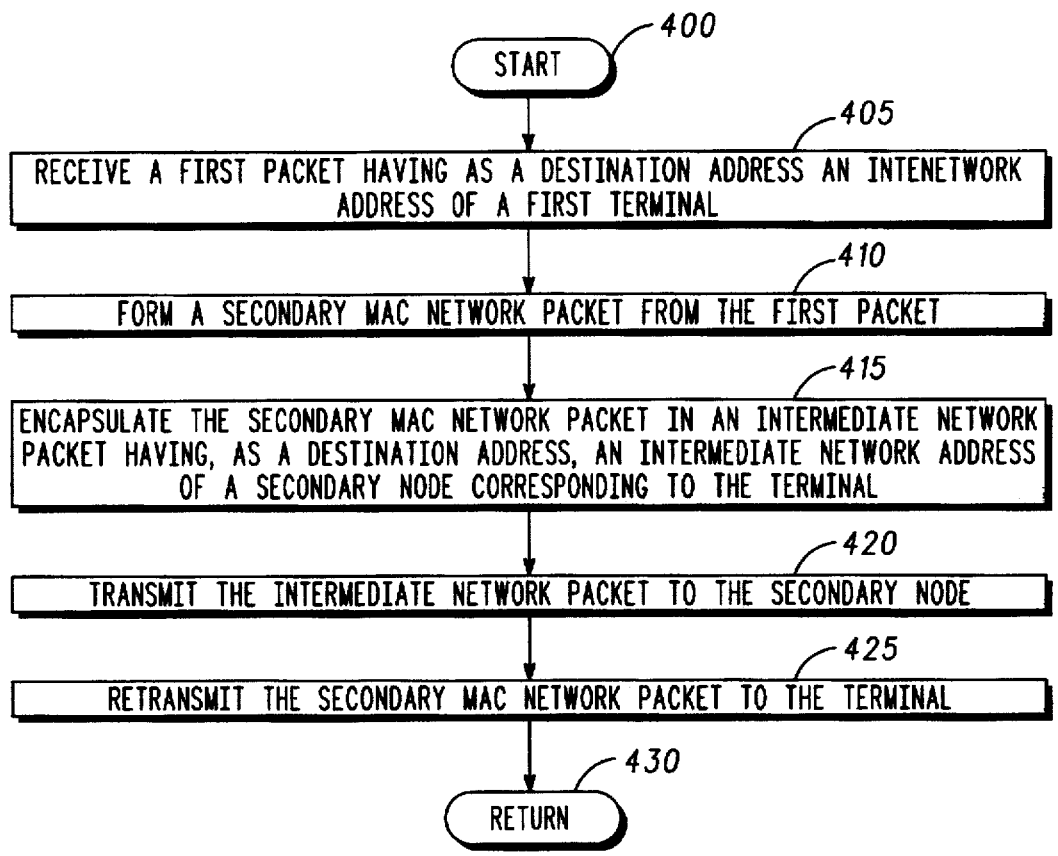
FIG. 10 is a flow diagram of the method of the present invention for transmission of data packets to a terminal.

FIG. 10 is a flow diagram of the method of the present invention for transmission of data packets to a terminal. Beginning with start step 400, a first data packet is received, having as its destination address an internetwork address of a first terminal, step 405. Next, a secondary MAC network packet if formed from the first data packet, step 410. The secondary MAC network packet is encapsulated in an intermediate network packet having, as a destination address, an intermediate network address of a secondary node corresponding to the terminal, step 415. The intermediate network packet is transmitted to the secondary node, step 420. The secondary MAC network packet (previously encapsulated) is retransmitted to the terminal, step 425, and the process may end, return step 430.

Figure 11:
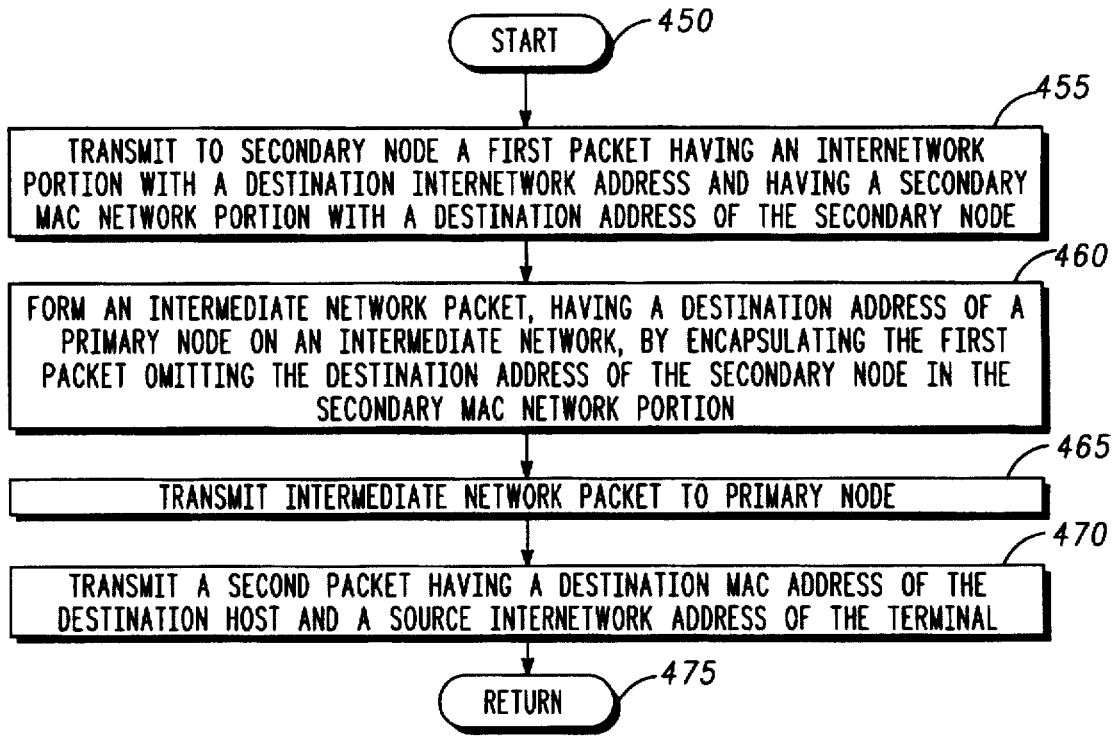
FIG. 11 is a flow diagram of the method of the present invention for transmission of data packets from a terminal.

FIG. 11 is a flow diagram of the method of the present invention for transmission of data packets from a terminal. Beginning with start step 450, a first packet is transmitted to a secondary node, the first packet having an internetwork portion with a destination internetwork address and having a secondary MAC network portion with a destination address of a secondary node, step 455. Next, an intermediate network packet, having a destination address of a primary node on an intermediate network, is formed by encapsulating the first packet and omitting the destination address of the secondary node in the secondary MAC network portion. The intermediate network packet is then transmitted on the intermediate network to a primary node, step 465. Lastly, a second packet is transmitted having a destination MAC address of the destination host and a source internetwork address of the terminal, step 470, and the process may end, return step 475.

Figure 12:
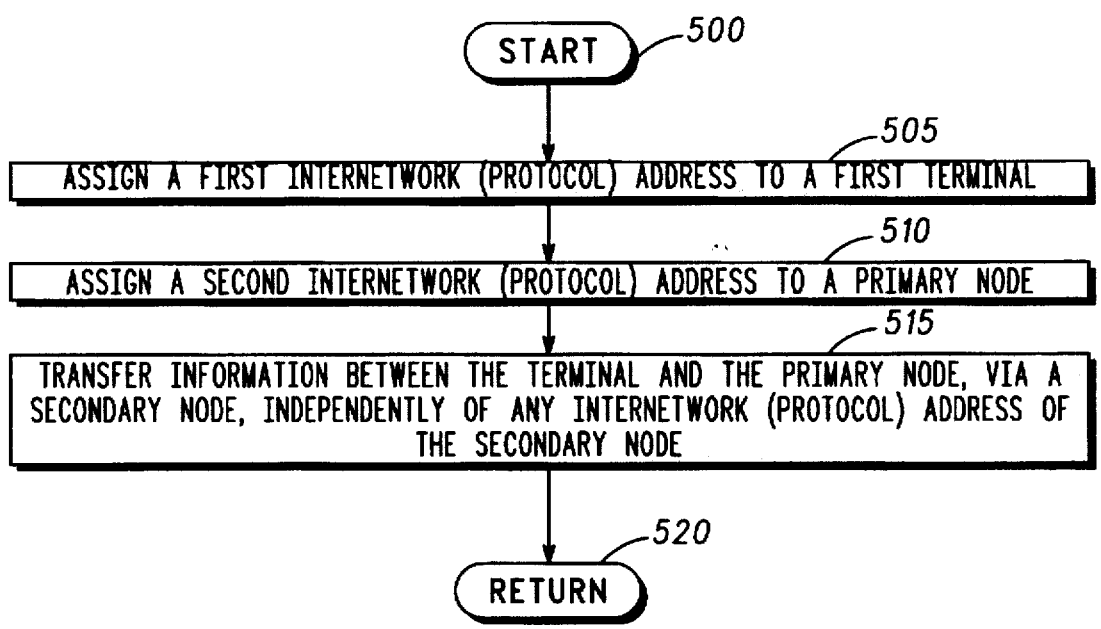
FIG. 12 is a flow diagram illustrating the system method of the present invention for distributed internetwork routing of information in a communication system.

FIG. 12 is a flow diagram illustrating the system method in accordance with the present invention for distributed internetwork routing of information in a communication system. Beginning with start step 500, a first internetwork protocol address of a plurality of internetwork protocol addresses is assigned to a terminal of the plurality of terminals, step 505. Next or concurrently with step 505, a second internetwork protocol address of the plurality of internetwork protocol addresses is assigned to the primary node, step 510. Then, as illustrated FIGS. 9 and 10, information is transferred between the terminal and the primary node, via a secondary node of the plurality of secondary nodes, independently of any internetwork protocol address of the secondary node, step 515, and the process may end, return step 520. More specifically, step 515 may include transmitting a packet of a plurality of packets from a secondary media access control network to the intermediate media access control network based upon a secondary media access control network destination address in conjunction with a protocol number field. Step 515 may also include transmitting a packet of a plurality of packets from the intermediate media access control network to a secondary media access control network based upon a secondary media access control network destination address (or a secondary media access control network frame) encapsulated within an intermediate media access control network packet.

In summary, FIG. 2 in light of FIGS. 8–12 illustrates an apparatus for distributed internetwork routing of information in a communication system, the communication system having a topology in which a primary node is coupleable to a plurality of secondary nodes via an intermediate network, in which the plurality of secondary nodes are coupleable to a secondary media access control network, in which the plurality of secondary nodes are geographically distributed, and in which a plurality of terminals are coupleable to the plurality of secondary nodes. The apparatus then comprises: first, a network interface 119 coupleable to a first network for reception of a first packet and for transmission of a second packet, the first packet having as a destination address an internetwork address of a first terminal of the plurality of terminals; second, a channel interface 125 coupleable to the intermediate network for the reception and transmission of an intermediate network packet; and third, a processor arrangement 120 coupled to the channel interface, the processor arrangement responsive through a set of program instructions to form a first secondary media access control network packet from the first packet and to form a first intermediate network packet for transmission on the intermediate network via the channel interface, the first intermediate network packet having, as a destination address, an intermediate network address of a secondary node of the plurality of secondary nodes, the secondary node corresponding to the first terminal; the processor arrangement further responsive to form the second packet from a second intermediate network packet, the second packet having a destination media access control address of a destination host and a source internetwork address of a second terminal of the plurality of terminals.

Also in summary, FIG. 3 in light of FIGS. 8–12 illustrate an apparatus for distributed internetwork routing of information in a communication system, the communication system having a topology in which a primary node is coupleable to a plurality of secondary nodes via an intermediate network, in which the plurality of secondary nodes are coupleable to a secondary media access control network, in which the plurality of secondary nodes are geographically distributed, and in which a plurality of terminals are coupleable to the plurality of secondary nodes. The apparatus comprises: first, a channel interface 160 coupleable to the intermediate network for reception of a first intermediate network packet and for transmission of a second intermediate network packet; second, a second interface 170 coupleable to a secondary media access control network for transmission of a first secondary media access control packet to a first terminal of the plurality of terminals and for reception of a second secondary media access control packet from a second terminal of the plurality of terminals; and third, a processor arrangement 150 coupled to the first channel interface 160 and to the second interface 170, the processor arrangement responsive through a set of program instructions to form the first secondary media access control packet from the first intermediate network packet by deleting intermediate network information, the processor arrangement further responsive to form the second intermediate network packet from the second secondary media access control packet by encapsulating the second secondary media access control packet in the second intermediate network packet.

The apparatus, method, system and system methodology of the present invention provide numerous advantages. First, the primary routing functionality is implemented in primary nodes or stations, resulting in the ability to implement secondary stations at relatively low cost. Second, the use of internetwork addresses is optimized, resulting in avoiding the undue and excess multiplication of internetwork addresses of the prior art. Third, multiple terminals may be connected to the same secondary station, such as several personal computers within a consumer household. Fourth, transmission bandwidth is conserved through the deletion of unnecessary information transmitted over the intermediate network. Fifth, primary stations provide for secondary MAC network packets, resulting in simplified secondary station functionality.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. A method for a system of distributed internetwork routing of information in a communication system, the communication system having a plurality of terminals in communication with a primary node via a plurality of secondary nodes, the secondary nodes coupled to the primary node via an intermediate media access control network, each terminal coupled to a secondary node via a secondary media access control network, the method comprising:

(a) assigning a first internetwork protocol address of a plurality of internetwork protocol addresses to a terminal of the plurality of terminals, (b) assigning a second internetwork protocol address of the plurality of internetwork protocol addresses to the primary node; and (c) transferring information between the terminal and the primary node, via a secondary node of the plurality of secondary nodes, independently of any internetwork protocol address of the secondary node.

2. The method of claim 1, further comprising:

(d) assigning a logical internetwork address of a plurality of logical internetwork addresses to each terminal of the plurality of terminals, each logical internetwork address of the plurality of logical internetwork addresses having a network portion which is independent of and transparent to the secondary media access control network.

3. The method of claim 1, further comprising:

(e) distinctively associating a logical internetwork address of each terminal of the plurality of terminals with a media access control network address of a corresponding secondary node of the plurality of secondary nodes.

4. The method of claim 1, further comprising:

(f) forming an internetwork address, corresponding to a first terminal of the plurality of terminals, by combining the network portion of the logical internetwork address corresponding to the first terminal with a host portion of an internetwork address corresponding to the first terminal.

5. The method of claim 1, wherein the information transferred between the terminal and the primary node comprises a packet transmitted by the terminal on a secondary media access control network and wherein step (c) further comprises:

(c1) transmitting the packet from the secondary media access control network to the intermediate media access control network based upon a secondary media access control network destination address in conjunction with a protocol number field.

6. The method of claim 5 wherein transmitting step (c1) is independent of any corresponding logical internetwork address of the plurality of logical internetwork addresses.

7. The method of claim 1, wherein the information transferred between the terminal and the primary node comprises a packet transmitted by the terminal on a secondary media access control network and wherein step (c) further comprises:

(c2) transmitting the packet from the secondary media access control network to the intermediate media access control network, via the secondary node, independently of any corresponding logical internetwork address, of the plurality of logical internetwork addresses, of the secondary node.

8. The method of claim 1, wherein the information transferred between the terminal and the primary node comprises a packet transmitted by the primary node on the intermediate media access control network and wherein step (c) further comprises:

(c3) transmitting the packet from the intermediate media access control network to a secondary media access control network based upon a secondary media access control network destination address encapsulated within an intermediate media access control network packet.

9. The method of claim 1, wherein the information transferred between the terminal and the primary node comprises a packet transmitted by the primary node on the intermediate media access control network and wherein step (c) further comprises:

(c4) transmitting the packet from the intermediate media access control network to a secondary media access control network by encapsulating a secondary media access control network frame within an intermediate media access control network packet.

10. The method of claim 1, wherein the information transferred between the terminal and the primary node comprises a packet transmitted by the primary node on the intermediate media access control network and wherein step (c) further comprises:

(c5) transmitting the packet from the intermediate media access control network to a secondary media access control network by forwarding an information frame containing a secondary node media access control address on the intermediate media access control network; a terminal media access control address on the secondary media access control network; and an encapsulation format of an internetworking protocol utilized on the secondary media access control network.

11. The method of claim 10 wherein the information frame further contains a primary node media access control address on the intermediate media access control network.

12. The method of claim 10 wherein the information frame further contains intermediate media access control network protocol control information.

13. The method of claim 10 wherein the information frame further contains a secondary node media access control address on the secondary media access control network.

14. The method of claim 1, wherein the information transferred between the terminal and the primary node comprises a packet transmitted by the terminal on a secondary media access control network, the packet including a media access control address corresponding to the secondary node, and wherein step (c) further comprises:

(c6) transmitting a modified packet, to the intermediate media access control network, the modified packet excluding the media access control address corresponding to the secondary node.

15. The method of claim 1, wherein the information transferred between the terminal and the primary node comprises a packet transmitted by the terminal on a secondary media access control network, the method further comprising:

(c7) transmitting a packet of a plurality of packets from the secondary media access control network to the intermediate media access control network transparently to a secondary media access control network destination address.

16. The method of claim 15, further comprising removing the secondary media access control network destination address from the packet prior to forwarding the packet to the intermediate media access control network.

17. The method of claim 1, wherein the secondary node includes a secondary node media access control address utilized on the intermediate media access control network and wherein step (b) further comprises maintaining an association, for a terminal internetwork address of a plurality of terminal internetwork addresses corresponding to the terminal, of the secondary node media access control address.

18. The method of claim 1, wherein the secondary node includes a secondary node media access control address utilized on a secondary media access control network and wherein step (b) further comprises maintaining an association, for a terminal internetwork address of a plurality of terminal internetwork addresses corresponding to the terminal, of the secondary node media access control address.

19. The method of claim 1, wherein the terminal includes a terminal media access control address utilized on a secondary media access control network and wherein step (b) further comprises maintaining an association, for a terminal internetwork address of a plurality of terminal internetwork addresses corresponding to the terminal, of the terminal media access control address.

20. The method of claim 1, wherein step (b) further comprises maintaining an association, for a terminal internetwork address of a plurality of terminal internetwork addresses corresponding to the terminal, of an encapsulation format of an internetworking protocol.

21. A method for distributed internetwork routing of information in a communication system, the communication system having a plurality of terminals in communication with a primary node via a plurality of secondary nodes, the secondary nodes coupled to the primary node via an intermediate network, each terminal coupled to a secondary node via a secondary media access control network, the method comprising:

(a) transmitting a first packet from a terminal to a secondary node of the plurality of secondary nodes, the first packet having an internetwork portion with a destination internetwork address of a destination host and having a secondary media access control network portion with a destination address of the secondary node;

(b) forming, by the secondary node, an intermediate network packet, having a destination address of the primary node on the intermediate network, by encapsulating at least the internetwork portion of the first packet;

(c) transmitting the intermediate network packet from the secondary node on the intermediate network to the primary node; and (d) transmitting, by the terminal, a second packet having a destination media access control address of the destination host and a source internetwork address of the terminal.

22. The method of claim 21 wherein step (b) further comprises encapsulating at least the internetwork portion of the first packet and excluding the destination address of the secondary node from the encapsulation.

23. The method of claim 21 wherein the transmission of the first packet is independent of an internetwork address of the secondary node.

24. The method of claim 21 wherein the transmission of the intermediate packet is independent of an internetwork address of the secondary node.

25. The method of claim 21 wherein the transmission of the second packet is independent of an internetwork address of the secondary node.

26. The method of claim 21 wherein the encapsulated packet includes a source media access control address of the terminal utilized on a secondary media access control network and excludes a destination media access control address of the secondary node utilized on the intermediate network.

27. The method of claim 21, wherein the first packet of step (a) further comprises a protocol number field.

28. The method of claim 21, wherein step (a) further comprises:

transmitting the first packet independently of any corresponding internetwork address, of the plurality of internetwork addresses, of the secondary node.

29. The method of claim 21, further comprising:

(e1) maintaining an association, for a terminal internetwork address of a plurality of terminal internetwork addresses corresponding to the terminal, of a secondary node media access control address utilized on the intermediate network.

30. The method of claim 21, further comprising:

(e2) maintaining an association, for a terminal internetwork address of a plurality of terminal internetwork addresses corresponding to the terminal, of a secondary node media access control address utilized on a secondary media access control network.

31. The method of claim 21, further comprising:

(e3) maintaining an association, for a terminal internetwork address of a plurality of terminal internetwork addresses corresponding to the terminal, of a corresponding terminal media access control address utilized on a secondary media access control network.

32. The method of claim 21, further comprising:

(e4) maintaining an association, for a terminal internetwork address of a plurality of terminal internetwork addresses corresponding to the terminal, of an encapsulation format of an internetworking protocol.

33. A method for distributed internetwork routing of information in a communication system, the communication system having a plurality of terminals in communication with a primary node via a plurality of secondary nodes, the secondary nodes coupled to the primary node via an intermediate network, each terminal coupled to a secondary node via a secondary media access control network, the method comprising:

(a) receiving a first packet, the first packet having as a destination address an internetwork address of a first terminal of the plurality of terminals;

(b) forming a secondary media access control network packet from the first packet;

(c) forming an intermediate network packet having, as a destination address, an intermediate network address of a secondary node of the plurality of secondary nodes, the secondary node corresponding to the terminal;

(d) transmitting the intermediate network packet to the secondary node; and (e) transmitting the secondary media access control network packet to the terminal.

34. The method of claim 33 wherein step (c) further comprises:

(c1) encapsulating the secondary media access control network packet in the intermediate network packet.

35. The method of claim 34 wherein the secondary media access control network packet, encapsulated in the intermediate network packet, has a destination media access control address of the terminal on a secondary media access control network and further has a source media access control address of a secondary node on the intermediate network.

36. The method of claim 33 wherein the transmission of the first packet is independent of an internetwork address of the secondary node.

37. The method of claim 33 wherein the transmission of the intermediate packet is independent of an internetwork address of the secondary node.

38. The method of claim 33 wherein the transmission of the second packet is independent of an internetwork address of the secondary node.

39. The method of claim 33, further comprising:

(f1) assigning a logical internetwork address of a plurality of logical internetwork addresses to each terminal of the plurality of terminals, each logical internetwork address of the plurality of logical internetwork addresses having a network portion which is independent of and transparent to the secondary media access control network.

40. The method of claim 33, further comprising:

(f2) distinctively associating a logical internetwork address of each terminal of the plurality of terminals with a media access control network address of a corresponding secondary node of the plurality of secondary nodes.

41. The method of claim 33 wherein step (c) further comprises:

(c2) encapsulating a secondary media access control network destination address in the intermediate network packet.

42. An apparatus for distributed internetwork routing of information in a communication system, the communication system having a plurality of terminals in communication with a primary node via a plurality of secondary nodes, the secondary nodes coupled to the primary node via an intermediate network, each terminal coupled to a secondary node via a secondary media access control network, the apparatus comprising:

- a network interface coupleable to a first network for reception of a first packet and for transmission of a second packet, the first packet having as a destination address an internetwork address of a first terminal of the plurality of terminals;
- a channel interface coupleable to the intermediate network for the reception and transmission of an intermediate network packet; and
- a processor arrangement coupled to the channel interface, the processor arrangement responsive through a set of program instructions to form a first secondary media access control network packet from the first packet and to form a first intermediate network packet for transmission on the intermediate network via the channel interface, the first intermediate network packet having, as a destination address, an intermediate network address of a secondary node of the plurality of secondary nodes, the secondary node corresponding to the first terminal; the processor arrangement further responsive to form the second packet from a second intermediate network packet, the second packet having a destination media access control address of a destination host and a source internetwork address of a second terminal of the plurality of terminals.

43. The apparatus of claim 42 wherein the second intermediate network packet encapsulates at least the destination media access control address of the destination host and the source internetwork address of the secondary terminal from a received second secondary media access control network packet, said second secondary media access control network packet further including a secondary node address.

44. The apparatus of claim 43 wherein the second intermediate network packet encapsulates at least the destination media access control address of the destination host and the source internetwork address of the secondary terminal from the received second secondary media access control network packet and excludes the secondary node address.

45. The apparatus of claim 42 wherein the processor arrangement is further responsive to encapsulate the first secondary media access control network packet in the first intermediate network packet.

46. The apparatus of claim 42 wherein the reception of the first packet is independent of an internetwork address of a secondary node of the plurality of secondary nodes.

47. The apparatus of claim 42 wherein the transmission of the first intermediate network packet and the reception of a second intermediate network packet are independent of an internetwork address of a secondary node of the plurality of secondary nodes.

48. The apparatus of claim 42 wherein the transmission of the second packet is independent of an internetwork address of a secondary node of the plurality of secondary nodes.

49. The apparatus of claim 42 wherein the apparatus is embodied within the primary node.

50. The apparatus of claim 42, wherein the processor arrangement further comprises:

- a first integrated multiprotocol processor coupled to the channel interface;
- a second integrated multiprotocol processor coupled to the channel interface; and
- a master controller coupled to the first integrated multiprotocol processor and to the second integrated multiprotocol processor.

51. The apparatus of claim 42 wherein the processor arrangement is further responsive to assign a logical internetwork address of a plurality of logical internetwork addresses to each terminal of the plurality of terminals, each logical internetwork address of the plurality of logical internetwork addresses having a network portion which is independent of and transparent to the secondary media access control network.

52. The apparatus of claim 42 wherein the processor arrangement is further responsive to distinctively associate a logical internetwork address of each terminal of the plurality of terminals with a media access control network address of a corresponding secondary node of the plurality of secondary nodes.

53. The apparatus of claim 42 wherein the processor arrangement is further responsive to associate a terminal internetwork address of a plurality of terminal internetwork addresses corresponding to the terminal, with a secondary node media access control address on an intermediate media access control network.

54. The apparatus of claim 42 wherein the processor arrangement is further responsive to associate a terminal internetwork address of a plurality of terminal internetwork addresses corresponding to the terminal, with a secondary node media access control address on a secondary media access control network.

55. The apparatus of claim 42 wherein the processor arrangement is further responsive to associate a terminal internetwork address of a plurality of terminal internetwork addresses corresponding to the terminal, with a corresponding terminal media access control address on a secondary media access control network.

56. The apparatus of claim 42 wherein the processor arrangement is further responsive to associate a terminal internetwork address of a plurality of terminal internetwork addresses corresponding to the terminal, with an encapsulation format of an internetworking protocol.

57. An apparatus for distributed internetwork routing of information in a communication system, the communication system having a plurality of terminals in communication with a primary node via a plurality of secondary nodes, the secondary nodes coupled to the primary node via an intermediate network, each terminal coupled to a secondary node via a secondary media access control network, the apparatus comprising:

- a first channel interface coupleable to the intermediate network for reception of a first intermediate network packet and for transmission of a second intermediate network packet;
- a second interface coupleable to a secondary media access control network for transmission of a first secondary media access control packet to a first terminal of the plurality of terminals and for reception of a second secondary media access control packet from a second terminal of the plurality of terminals; and
- a processor arrangement coupled to the first channel interface and to the second interface, the processor arrangement responsive through a set of program instructions to form the first secondary media access control packet from the first intermediate network packet by deleting intermediate network information, the processor arrangement further responsive to form the second intermediate network packet from the second secondary media access control packet by encapsulating the second secondary media access control packet in the second intermediate network packet.

58. The apparatus of claim 57 wherein the deleted intermediate network information comprises a destination media access control address of a secondary node on the intermediate network and a source media access control address of a primary node on the intermediate network.

59. The apparatus of claim 57 wherein the second secondary media access control packet has an internetwork portion with a destination internetwork address of a destination host and having a secondary media access control network portion with a destination address of a secondary node of the plurality of secondary nodes on the secondary media access control network.

60. The apparatus of claim 57 wherein the second intermediate network packet has a destination address on the intermediate network of the primary node and a source address on the intermediate network of a secondary node of the plurality of secondary nodes.

61. The apparatus of claim 57 wherein the reception of the first packet is independent of an internetwork address of a secondary node of the plurality of secondary nodes.

62. The apparatus of claim 57 wherein the transmission of the first intermediate packet and the reception of a second intermediate packet are independent of an internetwork address of a secondary node of the plurality of secondary nodes.

63. The apparatus of claim 57 wherein the transmission of the second packet is independent of an internetwork address of a secondary node of the plurality of secondary nodes.

64. The apparatus of claim 57 wherein the apparatus is embodied within a secondary node.

65. The apparatus of claim 57 wherein the processor arrangement is an integrated multiprotocol processor coupled to the channel interface.

66. The apparatus of claim 57 wherein the second intermediate network packet includes a secondary media access control network destination address in conjunction with a protocol number field.

67. A system for distributed internetwork routing of information, the system comprising:
- a primary station forming a primary node in a communication system topology, the primary station coupleable to a first network and coupled to an intermediate network;
- a plurality of secondary stations forming secondary nodes in the communication system topology, the plurality of secondary stations geographically distributed, the plurality of secondary stations coupled to the intermediate network for communication with the primary station; each of the plurality of secondary stations coupleable through a secondary media access control network to a number of terminals for communication with said terminals, the primary station and the secondary stations enabling a terminal to receive information from a source host on the first network routed from the primary station and to transmit information routed by the primary station to a destination host on the first network.

68. The system of claim 67 wherein the primary station comprises:
- a network interface coupleable to the first network for reception of a first packet and for transmission of a second packet, the first packet having as a destination address an internetwork address of a first terminal of the plurality of terminals;
- a channel interface coupleable to the intermediate network for the reception and transmission of an intermediate network packet; and
- a processor arrangement coupled to the channel interface, the processor arrangement responsive through a set of program instructions to form a first secondary media access control network packet from the first packet and to form a first intermediate network packet for transmission on the intermediate network via the channel interface, the first intermediate network packet having, as a destination address, an intermediate network address of a secondary node of the plurality of secondary nodes, the secondary node corresponding to the first terminal; the processor arrangement further responsive to form the second packet from a second intermediate network packet, the second packet having a destination media access control address of a destination host and a source internetwork address of a second terminal of the plurality of terminals.

69. The system of claim 67 wherein a secondary station of the plurality of secondary stations comprises:
- a first channel interface coupleable to the intermediate network for reception of a first intermediate network packet and for transmission of a second intermediate network packet;
- a second interface coupleable to the secondary media access control network for transmission of a first secondary media access control packet to a first terminal of the plurality of terminals and for reception of a second secondary media access control packet from a second terminal of the plurality of terminals; and
- a processor arrangement coupled to the first channel interface and to the second interface, the processor arrangement responsive through a set of program instructions to form the first secondary media access control packet from the first intermediate network packet by deleting intermediate network information, the processor arrangement further responsive to form the second intermediate network packet from the second secondary media access control packet by encapsulating the second secondary media access control packet in the second intermediate network packet.

70. The system of claim 67 wherein a first internetwork protocol address of a plurality of internetwork protocol addresses is assigned to a first terminal of the plurality of terminals.

71. The system of claim 67 wherein a second internetwork protocol address of the plurality of internetwork protocol addresses is assigned to the primary station.

72. The system of claim 67 wherein information is transferred between a terminal of the plurality of terminals and the primary station, via a secondary station of the plurality of secondary stations, independently of any internetwork protocol address of the secondary station.

73. The system of claim 67 wherein a logical internetwork address of a plurality of logical internetwork addresses is assigned to each terminal of the plurality of terminals, each logical internetwork address of the plurality of logical internetwork addresses having a network portion which is independent of and transparent to the secondary media access control network.

74. The system of claim 67 wherein a logical internetwork address of each terminal of the plurality of terminals is distinctively associated with a media access control network address of a corresponding secondary station of the plurality of secondary stations.

75. The system of claim 67 wherein a packet of a plurality of packets from the secondary media access control network is transmitted to the intermediate network based upon a secondary media access control network destination address in conjunction with a protocol number field.

76. The system of claim 67 wherein a packet of a plurality of packets from the intermediate network is transmitted to a secondary media access control network based upon a secondary media access control network destination address encapsulated within an intermediate media access control network packet.

77. The system of claim 67 wherein a packet of a plurality of packets from the intermediate network is transmitted to a secondary media access control network by encapsulating a secondary media access control network frame within an intermediate media access control network packet.

78. The system of claim 67 wherein a packet of a plurality of packets from the intermediate network is transmitted to a secondary media access control network by forwarding an information frame containing a secondary node media access control address on the intermediate network; a terminal media access control address on the secondary media access control network; and an encapsulation format of an internetworking protocol utilized on the secondary media access control network.

79. The system of claim 67 wherein a packet of a plurality of packets from the secondary media access control network is transmitted to the intermediate network omitting a secondary media access control network destination address.

80. The system of claim 67 wherein a packet of a plurality of packets from the secondary media access control network is transmitted to the intermediate network transparently to a secondary media access control network destination address.

81. The system of claim 67 wherein the primary station maintains an association, for a terminal internetwork address of a plurality of terminal internetwork addresses corresponding to a first terminal of the plurality of terminals, of a secondary node media access control address on the intermediate network.

82. The system of claim 67 wherein the primary station maintains an association, for a terminal internetwork address of a plurality of terminal internetwork addresses corresponding to a first terminal of the plurality of terminals, of a secondary node media access control address on a secondary media access control network.

83. The system of claim 67 wherein the primary station maintains an association, for a terminal internetwork address of a plurality of terminal internetwork addresses corresponding to a first terminal of the plurality of terminals, of a corresponding terminal media access control address on a secondary media access control network.

84. The system of claim 67 wherein the primary station maintains an association, for a terminal internetwork address of a plurality of terminal internetwork addresses corresponding to a first terminal of the plurality of terminals, of an encapsulation format of an internetworking protocol.

* * * * *